United States Patent
Iacovino, Jr. et al.

(10) Patent No.: US 6,442,227 B1
(45) Date of Patent: Aug. 27, 2002

(54) SLEEVE ASSEMBLY FOR NUCLEAR FUEL RACKS

(75) Inventors: John M. Iacovino, Jr., Murrysville; Jeffery C. Himler, Greensburg, both of PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 0 days.

(21) Appl. No.: 09/640,627

(22) Filed: Aug. 17, 2000

Related U.S. Application Data

(60) Provisional application No. 60/167,385, filed on Nov. 24, 1999.

(51) Int. Cl.$^7$ ................................................. G21C 7/00
(52) U.S. Cl. ...................... 376/272; 376/339; 376/267; 376/260; 376/327; 376/449; 250/506.1; 250/515.1; 250/518.1
(58) Field of Search ........................... 376/272, 339, 376/327, 449, 267, 260, 419, 440; 250/506.1, 515.1, 518.1, 507

(56) References Cited

U.S. PATENT DOCUMENTS

| | | | | |
|---|---|---|---|---|
| 3,249,505 A | * | 5/1966 | Laurent ........................ | 176/43 |
| 4,655,995 A | * | 4/1987 | Freeman et al. ............. | 376/267 |
| 4,716,004 A | * | 12/1987 | Merkovsky et al. ........ | 376/203 |
| 5,245,641 A | * | 9/1993 | Machado et al. ............ | 376/272 |
| 5,365,558 A | * | 11/1994 | Lippert et al. .............. | 376/445 |
| 5,438,597 A | * | 8/1995 | Lehnert et al. ............. | 376/272 |
| 5,479,463 A | * | 12/1995 | Roberts ....................... | 376/272 |
| 5,612,543 A | * | 3/1997 | Wenner et al. .............. | 250/507 |
| 5,629,964 A | * | 5/1997 | Roberts ....................... | 376/272 |
| 5,651,038 A | * | 7/1997 | Chechelnitsky et al. .... | 376/272 |
| 5,719,910 A | * | 2/1998 | Robert ........................ | 376/272 |
| 5,841,825 A | * | 11/1998 | Roberts ....................... | 376/272 |
| 5,872,826 A | * | 2/1999 | Fujieda et al. .............. | 376/447 |
| 5,905,770 A | * | 5/1999 | Wasinger .................... | 376/272 |
| 6,061,414 A | * | 5/2000 | Kopecky et al. ............ | 376/260 |

FOREIGN PATENT DOCUMENTS

| | | | | |
|---|---|---|---|---|
| JP | 0129598 | * | 5/1990 | ................ 376/272 |

* cited by examiner

*Primary Examiner*—Michael J. Carone
*Assistant Examiner*—R. Palabrica

(57) ABSTRACT

A sleeve assembly for refurbishing a fuel rack having cells in which fresh or spent nuclear fuel assemblies may be stored, in which the cells have elongate rack walls extending from a rack base plate and the rack base plate has flow holes communicating with the cells. The sleeve has at least one elongate wall extending from the topside of a sleeve base having an opposed bottom side. The sleeve base has a flow hole extending therethrough that communicates with one of the rack base plate flow holes. A pin assembly disposed in the sleeve base flow hole has resilient tabs extending beyond the bottom side of the sleeve base for extending into a rack base plate flow hole and resiliently engaging the rack base plate when the sleeve assembly is installed in one of the cells. The pin assembly resists horizontal and vertical movements of the sleeve assembly, permits water flow into the cell and permits sleeve assembly removal tools and inspection devices to access the pin assembly.

16 Claims, 3 Drawing Sheets

SLEEVE ASSEMBLY FOR NUCLEAR FUEL RACKS

CROSS-REFERENCE

This application is entitled to the benefit of the filing date of provisional U.S. Patent Application No. 60/167,385 filed Nov. 24, 1999.

BACKGROUND OF THE INVENTION

The invention relates to a sleeve assembly for refurbishing a submerged fuel rack employed to temporarily store fresh or spent nuclear fuel assemblies and more particularly to a sleeve assembly which may be readily installed in (or extracted from) an existing fuel rack without having to remove the rack from the pool in which it is submerged.

Fresh and spent nuclear fuel assemblies employed in commercial nuclear power plants for generating electric power are stored temporarily in cells of fuel racks submerged in water pools until such time as they are to be transported elsewhere. Spent fuel assemblies may need to be stored in such racks for several years. See, e.g., U.S. Pat. Nos. 4,630,738; 4,960,560; 5,245,641; 5,311,563 and 5,905,770. Spent fuel racks may have 100 or more open ended vertical cells generally formed of vertically oriented thin metal plates supported at their bottom edges by a horizontal base plate. The vertically oriented plates may contain boron or other neutron absorbing materials. Alternatively, certain of the vertically oriented walls may be covered with neutron absorbing plates. After years of use, the fuel racks may need to be refurbished.

The nuclear industry has found that, after years of service, some of neutron absorbing plates are deteriorating in the water pools in which the racks are submerged. Thus, the nuclear industry desires to refurbish these existing fuel racks. The industry has considered: mechanical refurbishment of the racks, entire replacement of the racks and fuel assembly covers. Mechanical refurbishment is a very complicated time-consuming procedure and undesirably requires removing the racks from the fuel pools. Entire replacement of the racks may take two years from design through installation. Also, replacement requires that the original racks must be removed from the pools and either decontaminated and free-released or processed and sent to a low-level radioactive waste burial site. In addition, it has been proposed to cover individual spent fuel assemblies with neutron absorbing plates. However these spent fuel assembly covers must always remain with the fuel assemblies and present handling/disposal problems when the spent fuel is transferred to dry fuel storage or a repository.

SUMMARY OF THE INVENTION

It is an object of the present invention to provide a fuel rack refurbishment that may be readily installed and/or extracted at any time. It is a further object to provide a refurbishment that can be readily performed in the fuel pool without having to remove the racks.

With these objects in view, the present invention resides in a sleeve assembly for refurbishing a fuel rack having cells in which fresh or spent nuclear fuel assemblies may be stored, which cells are defined by elongate walls extending from a rack base plate. The rack base plate has flow holes extending therethrough communicating with the interior portions of the cells for permitting pool water to flow into the cells and cool the fuel assemblies. The sleeve assembly includes a sleeve having at least one elongate wall (preferably containing neutron absorbing material if neutron absorption is of concern) extending from one side of a sleeve base having two opposed sides and the sleeve base has a flow hole extending therethrough. A pin assembly is disposed in the sleeve base flow hole and has at least one resilient tab extending beyond the second side of the sleeve base for extending into a rack base plate flow hole and engaging the rack base plate when the sleeve assembly is installed in one of the cells.

In a preferred embodiment of the sleeve assembly, the pin assembly has a tubular portion that fits in the sleeve base hole and a plurality of resilient tabs that extend beyond the second side of the sleeve base plate. Preferably, each tab has an intermediate section with a surface facing and extending parallel to the second side of the sleeve plate for resiliently engaging the rack base plate when the tabs extend into a rack base plate hole. Advantageously, the resilient tabs of the pin assembly may engage the walls of the rack base plate hole and the bottom surface of the rack base plate hole so that movement of the sleeve assembly is restricted both horizontally and vertically. In addition, such a structure permits water to flow through the sleeve base flow hole into a cell at all times, permits a sleeve assembly removal tool to be readily lowered through the center of the flow hole and manipulated to release the resilient tabs and extract the sleeve assembly, and permits an inspection device such as a CCD camera to inspect the condition of the resilient tabs. See, in this regard, U.S. Pat. No. 5,305,356 to Brooks et al. which discusses the use of a CCD (Charge Coupled Device) video camera to inspect nuclear power plants.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
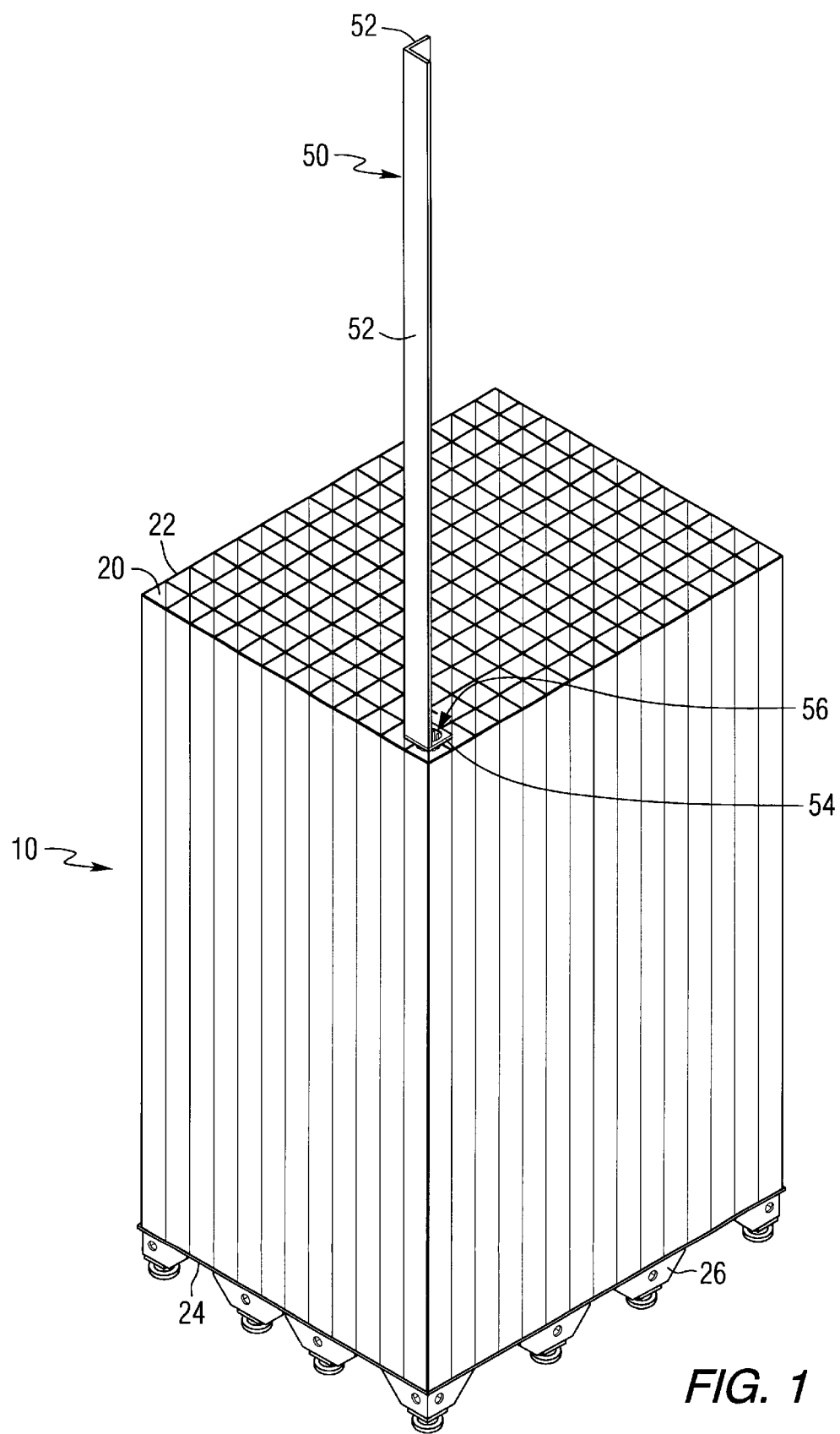
FIG. 1 is a schematic representation of a sleeve assembly of the present invention positioned over a common fuel rack for storing nuclear fuel assemblies.
Figure 3:
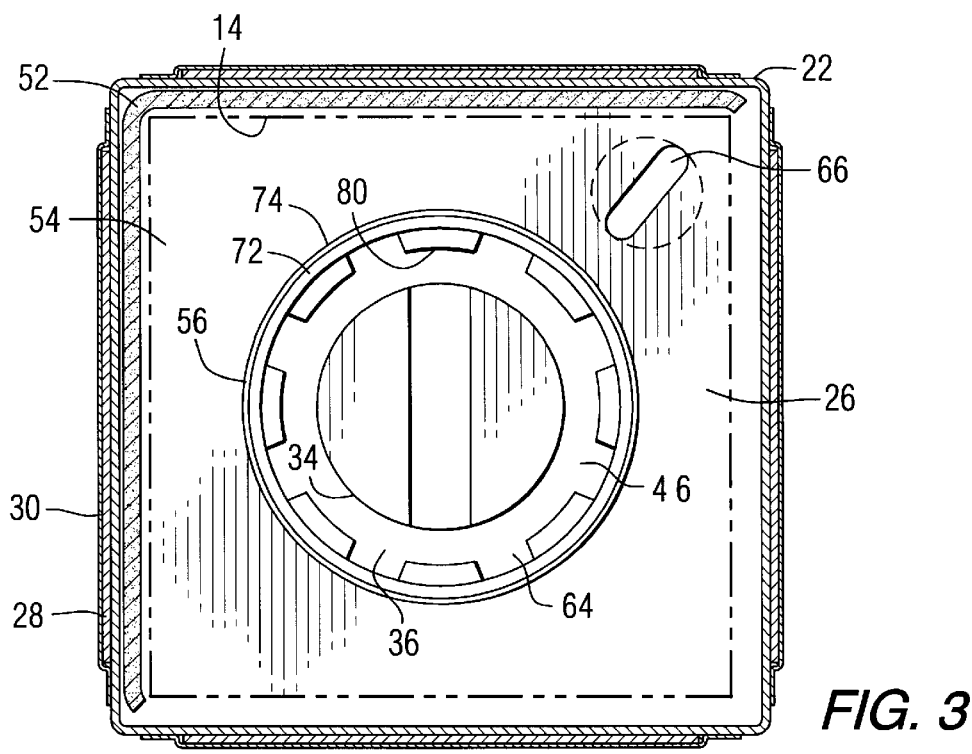
FIG. 3 is a cross sectional view of a fuel rack cell and sleeve assembly of FIG. 2 generally taken along Section Line 3—3.
Figure 2:
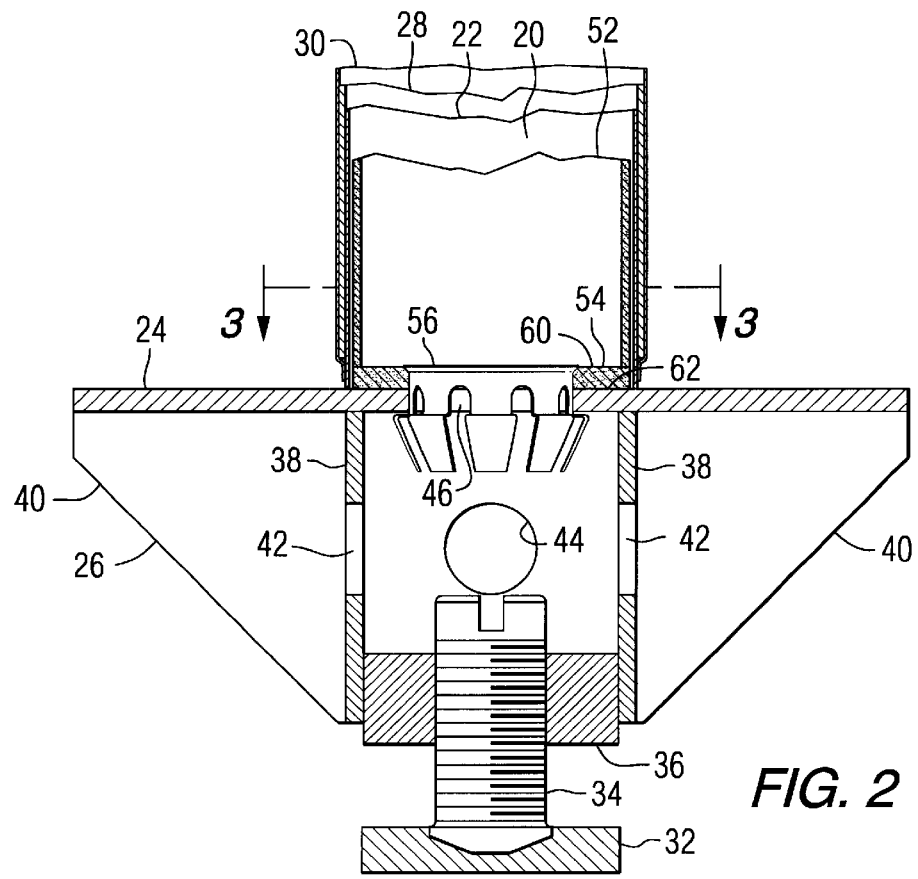
FIG. 2 is fragmentary sectional view of a fuel rack cell in which a sleeve assembly of the present invention has been installed.

Referring now to FIGS. 1–3, there is generally shown a fuel rack 10 for storing spent fuel assemblies (depicted in chain by a fuel assembly profile 14 in FIG. 3) in spent fuel pits of commercial nuclear reactor plants (not shown) for generating electric power. The fuel rack 10 has a plurality of cells 20 defined by vertically extending walls 22 and a supporting horizontally oriented base plate 24. The rack base plate 24 is supported and leveled by a plurality of floor supports 26 that stand on the floor of a spent fuel pit. The rack walls 22 may be up to about a tenth of an inch or more in thickness and the base plate may be up to about one half inch or more in thickness. As shown in FIG. 1, the fuel rack 10 has a 12×15 array of cells 20, although other fuel racks may have fewer or more cells. Each cell 20 is generally rectangular and each cell wall 22 is roughly 6 inches in length so that the overall dimensions of the rack 10 of FIG. 1 are about six feet by about eight feet in cross section by about 15 feet high. As is shown in FIG. 3, cells 20 in commercial plants may have neutron-absorbing sheets 28 attached to the vertical walls 22, which sheets may be covered by wrappers 30 to protect sheets 28 from hydraulic forces. As may be seen in FIG. 2, each floor support 26 may include a support pad 32 and leveling screw 34 which threadedly engages a horizontal plate 36. The horizontal plate 36 may be attached to the rack base plate 24 by vertically extending plates 38 and plates 40. The vertically extending plates 38 and plates 40 preferably have flow holes 42 and 44, respectively, and the rack base plate 24 has a flow hole 46 for permitting water to flow between the interior portion of the cell 20 and the water pool. The rack base plate flow hole 46 may be up to about four inches in diameter or more.

FIG. 1 shows a sleeve assembly 50 of the present invention aligned with a cell 20 of fuel rack 10 and in a position where it can be readily installed in the cell 20 with an installation tool (not shown) carried by an overhead crane to refurbish the fuel rack 10 while the rack 10 is submerged in the fuel pool. The sleeve assembly 50 generally includes at least one elongate wall 52, a sleeve base 54 and a locking or pin assembly 56. The elongate wall 52 may be flat or curved. Preferably, the elongate wall 52 and the pin assembly 56 are welded to the sleeve base 54.

FIGS. 1–3 show an assembly 50 having two mutually perpendicular walls 52, although the sleeve assembly 50 may have up to four walls 52. In the preferred practice of the present invention, where it is desired to repair the deterioration of the neutron absorbing sheets 28, the walls 52 preferably contain substantial amounts of boron or other neutron absorbing materials. Most preferably, the walls 52 are an extruded composite of boron carbide and aluminum as generally disclosed by U.S. Pat. No. 5,980,602. These extruded products are available under the trademark BORALYN from Alyn Corporation of Irvine Calif. Other commercially available neutron absorbing materials are sold under the trademarks BORAL and BORAFLEX.

The elongate walls 52 extend upwardly from one side 60 of the sleeve base 54. The sleeve base 54 has an opposed second surface 62 designed to rest on the rack base plate 24 when the sleeve assembly 50 is installed. Importantly, the sleeve base 54 has a flow hole 64, which preferably is no smaller than and alignable with the flow hole 46 in the rack base plate 24. The sleeve base 54 is preferably similar to the sleeve material, and may be a BORALYN extruded plate of about one half inch in thickness or more. The sleeve base 54 may have one or more undercut keyways in its corners (depicted by keyway 66 with a circular undercut) for releasably receiving the rotatable end(s) of an elongated installation tool suspended from the hooks of an overhead spent fuel pool crane (not shown).

Figure 4:
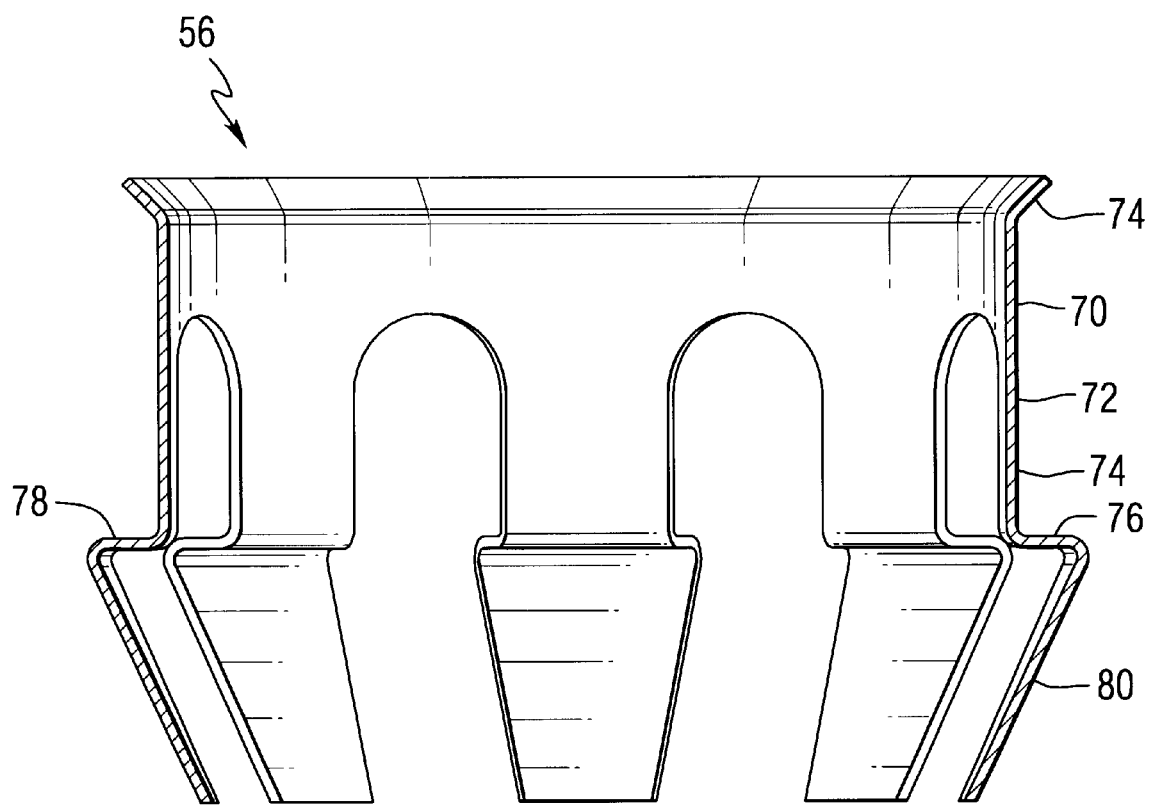
FIG. 4 is an enlarged cross sectional view of the pin assembly shown in FIG. 2

The pin assembly 56 removably attaches the sleeve assembly 50 in the cell 20 to the rack 10. As shown in FIGS. 2, 3 and 4, the pin assembly 56 has a tubular portion 70 disposed in the sleeve base flow hole 64 for engaging the rack base plate 24 while up to eight or more resilient tabs 72 extend from the tubular portion 70 into the below rack base plate flow hole. The pin assembly 56 may be extruded or otherwise fabricated of an aluminum alloy or other metal and have a thickness of about 0.05 inches. The tubular portion 70 may have a rim 74 that is designed to seat on a chamfered edge of the upper surface of the sleeve base 54 when the balance of the tubular portion 70 fits through the sleeve flow hole 64 and the resilient tabs 72 extend beyond the bottom surface 62 of the sleeve base 24 and through the rack base plate hole 46. Each resilient tab 72 has a first section 74 that extends substantially vertically from the tubular portion 70 of the pin assembly 56 for resiliently engaging the rack base plate 24 and limiting horizontal movement of the sleeve assembly 50 when the pin assembly 56 is installed. Preferably, an intermediate tab section 76 extends from the first tab section 74 and has a surface 78 facing and extending substantially parallel to the bottom surface of the sleeve base 54 and the bottom surface of the rack base plate 24. Advantageously, the intermediate tab section 76 will limit upward movement of the sleeve assembly 50 under the drag forces of an upwardly moving fuel assembly 14. Preferably, a tab end section 80 extends at an acute angle from the intermediate section 76 and inwardly of the tubular portion 70. Advantageously, the angled tab end section 80 cushions the sleeve assembly 50 (which will weigh about forty pounds or more) as it centers on the rack base plate 24 under the weight of the sleeve assembly 50. In addition, the tab end section 80 presents a self aligning mechanism for seating the sleeve assembly 50 in the cell 20

Advantageously, the pin assembly 56 will not be contacted by a fuel assembly 14 as the fuel assembly 14 is placed in or removed from a cell 20 until the fuel assembly is within about an inch of being seated. In addition, the pin assembly design can withstand substantial upward and downward drag forces of a stuck fuel assembly 14 on the sleeve walls 22. Also, the pin assembly design does not substantially obstruct the area of the flow hole 46.

While a present preferred embodiment of the present invention has been shown and described, it is to be understood that the invention may be otherwise variously embodied within the scope of the following claims of invention.

What is claimed is:

1. A nuclear fuel assembly storage rack sleeve assembly for refurbishing a fuel rack having cells in which fresh or spent nuclear fuel assemblies may be stored, the cells defined by elongate rack walls extending from a rack base plate, the rack base plate having flow holes extending therethrough communicating with the cells, comprising:

a sleeve having at least one elongate wall fixedly attached to a sleeve base plate, the sleeve base plate having a first side disposed above a second opposed side and defining a flow hole extending from the first side to the second opposed side, the elongate wall extending upwardly from the first side of the sleeve base plate; and a pin assembly disposed in the sleeve base plate flow hole and hating at least one resilient tab, the resilient tab extending downwardly through the flow hole in the sleeve base plate and beyond the second opposed side of the sleeve base plate for extending into a rack base plate flow hole and resiliently engaging the rack base plate when the sleeve assembly is installed in one of the cells.

2. The sleeve assembly of claim 1, wherein the at least one resilient tab is one of a plurality of resilient tabs that extend beyond the second side of the sleeve base plate for resiliently engaging the rack base plate when the tabs extend into a rack base plate hole.

3. The sleeve assembly of claim 1, wherein the at least one tab has an intermediate section with a surface facing and substantially parallel to the second side of the sleeve base plate for engaging the rack base plate when the tab extends into the rack flow hole.

4. The sleeve assembly of claim 3, wherein the at least one tab has an end section which extends from the intermediate section at an acute angle.

5. The sleeve assembly of claim 1, wherein the at least one tab extends from a tubular portion of the pin assembly.

6. The sleeve assembly of claim 5, wherein the at least one tab has an intermediate section with a surface facing and substantially parallel to the second side of the sleeve base plate.

7. The sleeve assembly of claim 6, wherein the intermediate section of the at least one tab extends outwardly of the tubular portion of the pin assembly.

8. The sleeve assembly of claim 7, wherein the at least one tab has an end section which extends from the intermediate section at an acute angle inwardly of the tubular portion of the pin assembly.

9. The sleeve assembly of claim 1, wherein the pin assembly is of integral construction.

10. The sleeve assembly of claim 1, wherein the pin assembly is welded to the sleeve assembly base plate.

11. The sleeve assembly of claim 1, wherein the sleeve assembly comprises an extrusion comprised of boron carbide and aluminum.

12. The sleeve assembly of claim 11, wherein the sleeve base plate is comprised of boron carbide and aluminum.

13. The sleeve assembly of claim 12, wherein the sleeve base plate has at least one undercut keyway for receiving an installation tool.

14. The sleeve assembly of claim 2, wherein the plurality of resilient tabs are spaced apart and the spaces between adjacent resilient tabs extend above the second opposed side of the sleeve base plate.

15. The sleeve assembly of claim 3 installed in a fuel rack cell defined by elongate walls extending above a fuel rack base plate, with the sleeve assembly base plate and the elongate walls of the fuel rack cell defining a clearance width wherein the tab intermediate section of the pin assembly is longer than the clearance width.

16. The sleeve assembly of claim 15, wherein the pin assembly has a plurality of spaced apart resilient tabs and each tab has an intermediate section that is longer than the clearance width defined by the sleeve assembly base plate and the elongate walls of the fuel rack cell.

* * * * *